United States Patent
Helling et al.

(10) Patent No.: US 10,637,251 B2
(45) Date of Patent: Apr. 28, 2020

(54) MODULAR ENERGY STORAGE DIRECT CONVERTER SYSTEM

(71) Applicant: Universitaet der Bundeswehr Muenchen, Neubiberg (DE)

(72) Inventors: Florian Helling, Munich (DE); Thomas Weyh, Munich (DE)

(73) Assignee: Universitaet der Bundeswehr Muenchen, Neubiberg (DE)

( * ) Notice: Subject to any disclaimer, the term of this patent is extended or adjusted under 35 U.S.C. 154(b) by 362 days.

(21) Appl. No.: 15/327,754

(22) PCT Filed: Jul. 9, 2015

(86) PCT No.: PCT/EP2015/065658
§ 371 (c)(1),
(2) Date: Jan. 20, 2017

(87) PCT Pub. No.: WO2016/012247
PCT Pub. Date: Jan. 28, 2016

(65) Prior Publication Data
US 2017/0207631 A1    Jul. 20, 2017

(30) Foreign Application Priority Data
Jul. 23, 2014 (DE) .................. 10 2014 110 410

(51) Int. Cl.
*H02J 3/38* (2006.01)
*H02M 7/483* (2007.01)
(Continued)

(52) U.S. Cl.
CPC ............. *H02J 3/382* (2013.01); *H02J 3/383* (2013.01); *H02J 3/387* (2013.01); *H02J 7/0052* (2013.01);
(Continued)

(58) Field of Classification Search
CPC .. H02J 3/382; H02J 3/383; H02J 3/387; H02J 7/0052
(Continued)

(56) References Cited

U.S. PATENT DOCUMENTS 5,483,433 A  1/1996 Yang
5,761,058 A  6/1998 Kanda et al.
(Continued)

FOREIGN PATENT DOCUMENTS

CN  102130619 A  7/2011
CN  103235219 A  8/2013
(Continued)

OTHER PUBLICATIONS

Maharjan, et al. "Fault-Tolerant Operation of a Battery-Energy-Storage System Based on a Multilevel Cascade PWM Converter With Star Configuration." IEEE Transactions on Power Electronics, vol. 25, No. 9, Sep. 2010.
(Continued)

*Primary Examiner* — Hal Kaplan
*Assistant Examiner* — Swarna N Chowdhuri
(74) *Attorney, Agent, or Firm* — Eschweiler & Potashnik, LLC

(57) ABSTRACT invention describes a modular energy storage direct converter system (10) which comprises the following: a control device (20) and at least one bridge branch (12) which comprises The a plurality of modules (14) which are connected in series, wherein each of said modules (14) comprises a storage element for electrical energy, in particular a battery, or an energy conversion element. Said modules (14) are designed and can be actuated such that the storage element or energy conversion element of a module can be selectively deactivated, and that the storage elements or energy conversion elements of two modules, which are
(Continued)

separated by at least one intermediate module with a deactivated storage element/energy conversion element, can be connected selectively in parallel and in series.

21 Claims, 13 Drawing Sheets

(51) Int. Cl.
    *H02J 7/00*           (2006.01)
    *H02M 1/32*         (2007.01)

(52) U.S. Cl.
    CPC .......... *H02J 7/0068* (2013.01); *H02M 7/483* (2013.01); *H02J 2007/0059* (2013.01); *H02M 2001/325* (2013.01); *H02M 2007/4835* (2013.01)

(58) Field of Classification Search
    USPC ......................................................... 307/52
    See application file for complete search history.

(56) References Cited

U.S. PATENT DOCUMENTS

| | | | |
|---|---|---|---|
| 6,954,366 B2 | 10/2005 | Lai et al. | |
| 6,969,967 B2 | 11/2005 | Su | |
| 7,269,037 B2 | 9/2007 | Marquardt | |
| 7,755,918 B2 | 7/2010 | Barbosa et al. | |
| 7,817,451 B2 | 10/2010 | Barbosa et al. | |
| 9,496,799 B2 | 11/2016 | Goetz et al. | |
| 9,502,960 B2 | 11/2016 | Weyh et al. | |
| 2005/0127853 A1* | 6/2005 | Su .................. | H02M 7/487 318/108 |
| 2010/0133901 A1* | 6/2010 | Zhang ................ | H02M 5/458 307/11 |
| 2011/0013441 A1 | 1/2011 | Gruber et al. | |
| 2011/0019449 A1 | 1/2011 | Katoh et al. | |
| 2011/0032738 A1 | 2/2011 | Skinner et al. | |
| 2011/0096580 A1 | 4/2011 | Asplund | |
| 2011/0291582 A1 | 12/2011 | Wei et al. | |
| 2013/0200860 A1 | 8/2013 | Takeda et al. | |
| 2014/0049230 A1* | 2/2014 | Weyh .................. | H02M 7/483 323/207 |
| 2014/0226377 A1* | 8/2014 | Goetz ................. | H02M 3/158 363/65 |
| 2015/0270801 A1 | 9/2015 | Kessler et al. | |

FOREIGN PATENT DOCUMENTS

| | | |
|---|---|---|
| DE | 4203882 A1 | 9/1992 |
| EP | 1976107 A1 | 10/2008 |
| JP | 2011045210 A | 3/2011 |
| WO | 0105022 A1 | 1/2001 |
| WO | 03090331 A2 | 10/2003 |
| WO | 2006053448 A1 | 5/2006 |
| WO | 2008046772 A1 | 4/2008 |
| WO | 2012072168 A1 | 6/2012 |
| WO | 2012072197 A2 | 6/2012 |

OTHER PUBLICATIONS

International Search Report dated Sep. 23, 2015 for International Application No. PCT/EP2015/065658.
International Preliminary Report on Patentability dated Jul. 10, 2013 for International Application No. PCT/EP2011/005385. 14 Pages.
International Search Report dated May 3, 2013 to Patent Application PCT/EP2011/005385.
G. Gateau, et al.; "Stacked Multicell Converter (SMC): Topology and Control"; EPE 2001-Graz; 2001; p. 1-10.
Barnes, et al. "Implementation of a Three-Phase Multilevel Boosting Inverter Using Switched-Capacitor Converter Cells." IEEE, Energy Conversion Congress and Exposition (ECCE), Sep. 12-16, 2010, S. 2141-2147.
Grandi, et al. "Dual Inverter Space Vector Modulation with Power Balancing Capability.", IEEE. 2009, pp. 721-728.
International Search Report dated Mar. 12, 2014 for International Application No. PCT/EP2012/002727.
Non-Final Office Action dated Oct. 7, 2015 for U.S. Appl. No. 14/235,812.
Notice of Allowance dated Apr. 25, 2016 for U.S. Appl. No. 14/235,812.
Notice of Allowance dated Jul. 15, 2016 U.S. Appl. No. 14/235,812.
Non-Final Office Action dated Jul. 8, 2015 for U.S. Appl. No. 13/990,463.
Non-Final Office Action dated Feb. 1, 2016 for U.S. Appl. No. 13/990,463.
International Preliminary Report on Patentability dated Jun. 4, 2013 for International Application No. PCT/EP2011/005385. 14 Pages.
International Preliminary Report on Patentability dated Feb. 2, 2017 for International Application No. PCT/EP2015/065658.

\* cited by examiner

MODULAR ENERGY STORAGE DIRECT CONVERTER SYSTEM

This Application is a National Phase Entry claiming priority to PCT Application Number PCT/EP2015/065658 filed on Jul. 9, 2015, which claims priority to German Application number 10 2014 110 410.2 filed on Jul. 23, 2014. The contents of the above referenced applications are hereby incorporated by reference in their entirety.

FIELD OF THE INVENTION

The present invention is in the field of electrical engineering. In particular it relates to a modular energy storage direct converter system that contains at least one bridge branch, which comprises a plurality of modules connected one after the other.

BACKGROUND OF THE INVENTION

Battery systems are gaining increased importance in many areas of technology. A particularly important application relates to electric vehicles, in which the battery systems are a key component for the mobility of the future. A further application of extraordinary importance is that of battery systems as stationary energy storage devices for renewable energies.

Many of the energy storage systems currently in use consist of a series connection or parallel connection of up to thousands of energy storage elements, wherein a relatively small voltage in comparison to the required total voltage is applied, or can be applied to each energy storage element. By using a series connection, the individual voltages add up to produce the total voltage. Using a parallel connection means that the charge is summed. For example, in an electric car such as the Tesla Model S, approx. 6,000 battery cells are installed. The cell voltages and the electrical properties of the cells strongly depend on the cell technology that is used. The cell voltages of typical systems range from 1.0 volts to 3.7 volts.

Due to slightly different physical properties of the cells, they differ with regard to their capacities and their ageing behaviour. Due to the different voltages of the individual cells obtained as a result, in current battery systems it is necessary to balance out the charges of all cells in order to increase the total capacity of the battery system. For performing this balancing, so-called battery management systems (BMS) are currently used, which operate on the basis of an active or passive balancing method. However, such known battery management systems are comparatively expensive, lossy, usually expensive and under certain circumstances even damaging to the cells.

In order to make the energy of the battery system usable for a consumer, a power-electronic converter is also required which is used to stabilize the output voltage or to generate a desired phase of an AC voltage. Furthermore, to charge the battery system a further converter, a so-called charging converter, is usually required.

The state of the art in battery systems has a number of disadvantages. One disadvantage is that the operating points of the system either cannot be adapted to the current requirements at all, or only to a small extent, and that the overall power of the system is typically limited by the weakest sub-unit in the assembly.

In the case of BMS, which are based on a passive balancing of the energy storage cells, energy is knowingly wasted by electrical energy being converted into thermal energy and dissipated. It is also especially the case with passive balancing, that the weakest cell in the assembly determines the total capacity, for example by making the termination of a charging or discharging process necessary.

BMS with more active balancing are usually based on the principle that energy is shifted by charge transfer between cells. This charge transfer, however, is always accompanied by an energy loss and also reduces the service life of the cells.

In the conventional systems it is typically also necessary that all cells in the system are of the same type and have the smallest possible differences in their electrical and physical characteristics. In addition, current systems typically operate with high technical circuitry and filter complexity, which increases the energy consumption and the costs.

Similar problems to those in battery systems also occur in energy conversion systems, which comprise, for example, fuel cells or solar modules as the energy conversion elements. In energy conversion systems of this type also, a plurality of cells are connected in series to increase the total voltage and connected in parallel to increase the charge or the current flow.

SUMMARY OF THE INVENTION

The object of the invention is to provide a system for energy storage or energy conversion, in which the above problems are avoided.

This object is achieved by a system according to Claim 1, a production method for such a system according to Claim 27 and a method for providing a desired voltage or a phase of a desired voltage according to Claim 29. Advantageous further developments are specified in the dependent claims.

In accordance with the invention, a modular energy storage direct converter system is provided, which comprises at least one bridge branch that comprises a plurality of modules connected one after the other. Each of these modules comprises at least two first terminals and at least two second terminals, a storage element for electrical energy, in particular a battery, or an energy conversion element, and a plurality of switches, wherein in each two adjacent modules among the said modules, the first terminals of the one module are connected either directly or via an intermediate component to the second terminals of the other module.

The system further comprises a control device that is configured to receive information regarding the current charging state of the storage elements, or regarding the voltage or power of the energy conversion elements, and that is suitable for actuating at least a part of said plurality of switches in an energy supply mode depending on the current charging state of the storage elements or on the current power or voltage of the energy conversion elements, in such a way that the bridge branch as a whole supplies a desired voltage or a phase of a desired voltage.

The said modules are designed and can be actuated in such a way that the storage element or energy conversion element of a module can be selectively deactivated, and the storage elements or energy conversion elements of two modules, which are separated by at least one intermediate module with a deactivated storage element/energy conversion element, can be selectively connected in parallel and in series.

The system of the invention is a "modular system", because it comprises a plurality of modules connected one after the other, each of the said series-connected modules comprising either a storage element for electrical energy, for example a battery, or an energy conversion element, such as a solar cell or a fuel cell, which can convert chemical or light energy into electrical energy. It is possible that the same system comprises both storage elements for electrical energy as well as energy conversion elements. In fact, even a single module can contain both a storage element as well as an energy conversion element. Other designs are also conceivable however, in which only storage elements, i.e. such as batteries or battery cells, are present. Finally, it is also conceivable that the system only contains energy conversion elements. Since the main applications of the system relate to cases in which at least one storage element for electrical energy is provided, the system is designated as an "energy storage system", which in the terminology of this disclosure is also intended to include the special case wherein the system solely comprises energy conversion elements.

Finally, the system is a "direct converter system" in so far as it is designed to actuate at least a part of the said plurality of switches in an energy supply mode, depending on the current state of charge of the storage elements or on the current power or voltage of the energy conversion elements, in such way that the bridge branch as a whole already supplies a desired voltage or a phase of a desired voltage, so that no further converter is any longer needed.

It should be noted that modules with the facility for dynamic series and parallel connection of single modules have already been disclosed in WO2012/072168 A2, but in that case in the context of a multi-level converter topology. Unlike in the case of the multilevel converter though, in the invention it is provided that a storage element or energy conversion element of a module can be selectively deactivated, and that the storage elements or energy conversion elements of two modules, which are separated by at least one intermediate module with a deactivated storage element/energy conversion element, can be selectively connected in parallel or in series.

Due to the facility to selectively connect in series or in parallel not only adjacent modules, but also such modules that are separated only by deactivated modules, the above-mentioned problems in the prior art can be avoided in an elegant and cost-effective manner.

As will be shown in more detail below by reference to exemplary embodiments, no charge transfer between storage elements is required for supplying energy. Instead, it is possible to interconnect the storage elements or energy conversion elements in the energy supply mode in such a way that the bridge branch as a whole already delivers a desired voltage or a phase of a desired voltage, so that no other converter is needed, while at the same time avoiding the need to balance the charge between the individual storage elements/energy conversion elements by charge transfer. It is therefore of crucial importance for this purpose that individual modules can be selectively deactivated, for example because they do not have the charge state currently required, and can be engaged when their current charge, voltage or power state "fits" the desired energy supply. In particular, a group of adjacent modules can be successively connected in parallel in a synchronised manner during both charging and discharging, in such a way that despite initially differing charging states, no charge transfer is required between modules, as explained in more detail below by reference to exemplary embodiments.

The modular energy storage direct converter system also allows the use of storage elements/energy conversion systems of different types or even of different ageing states, without this automatically leading to a reduction in the performance or a loss of efficiency.

In an advantageous embodiment, the control device is suitable for actuating at least a part of the said plurality of switches in a charging mode depending on the current state of charge of the storage elements, or on the current power output or voltage of the energy conversion elements, in order to charge at least some of the storage elements by means of an AC or DC voltage applied externally to the bridge branch. Therefore, no additional charging converter is used, such as is currently required, for example, in electric cars. The system of the invention can in principle be efficiently charged up by means of any desired external voltages. This provides a great advantage, for example when used in electric automobiles, because no additional charging converter need be present on the vehicle, or because no charging stations with such a charging converter are required, which increases the flexibility enormously. Instead, the electric car can be selectively charged e.g. with three-phase current with an effective voltage of 400 V or 230 V AC voltage, depending on what is available.

In an advantageous embodiment, the storage element/energy conversion element of a module has two poles. In addition, the storage element/energy conversion element can be deactivated by a switching state of the switches of the corresponding module, in which at least one of the poles of the storage element/energy conversion element is not connected to either of the first and second terminals.

As will be shown in the following exemplary embodiments, many possible means exist for making a storage element/energy conversion element deactivatable, and the invention is not restricted to any specific circuit. Systems which have proved advantageous, however, are those in which one of the poles of the storage element/energy conversion element can be decoupled from the rest of the module by an associated switch. This enables the desired functionality with a comparatively small number of switches.

In one embodiment, the modules can be operated in all four quadrants of the current-voltage plane. In particular, the modules used are designed and can be actuated in such a way that the storage elements/energy conversion elements of two adjacent modules can be connected in series with the same polarity, in series with opposite polarity, in parallel with the same polarity, and in parallel with opposite polarity The use of such "four-quadrant modules" allows a maximum flexibility both in the charging mode as well as in the energy supply mode.

Alternatively however, the modules can also be designed such that they can be operated in only two quadrants of the current-voltage plane. In this case, an additional circuit can be provided by means of which a chain of two-quadrant modules connected in series can be polarity-reversed as a single unit.

It is also possible that the said four-quadrant modules are formed at least partly by a polarity-reversible chain of at least two two-quadrant modules.

In an advantageous embodiment the said modules have three or more first and second terminals.

In an advantageous embodiment, the at least two outermost connections in the first and/or last module of the bridge branch are connected to each other.

The energy storage direct converter system of the invention may contain two, three, four, five or more bridge branches. At the locations where the bridge branches meet, the phases of a desired voltage can be tapped off.

In an advantageous embodiment the at least two outermost connections in the first and/or last module of a bridge branch are separately connected to at least two outermost terminals of a module of an adjoining bridge branch.

In an advantageous embodiment, two, three, four, five or more bridge branches are connected together in a star topology or in a ring topology.

In a particularly advantageous embodiment, the two, three, four, five or more bridge branches are interconnected in a ring topology in such a way that the at least two outermost terminals of each bridge branch are separately connected to the at least two outermost terminals of the adjoining bridge arm, and the control device is configured to actuate at least a part of the said plurality of switches such that at least two mutually independent ring currents can flow through the ring formed by the bridge branches. In this case, for example, the one ring current can be used to compensate for an asymmetry of a corresponding multi-phase network. For example, the three currents of a three-phase network due to an unbalanced load are not equal in size in terms of their magnitude. The ring current of the ring topology thus enables a power transfer among the phases in a manner that allows the currents to appear equal in magnitude from the point of view of the source. The second ring current can be used to balance out the charge states of individual storage/energy conversion elements—even beyond the phases of the direct converter.

In an advantageous embodiment, inductors can be provided within the at least one bridge branch, in particular within one module or between adjacent modules. These inductances can serve to reduce current peaks when switching over the voltage.

The said switches are preferably formed at least predominantly by MOS-FET, IGBTs, IGCTs or thyristors.

The storage elements can be formed by one or more of the following elements: a capacitor, a battery cell, in particular a Second-Use-Cell or a redox flow cell.

The said energy conversion elements can be formed by solar cells, fuel cells or thermocouple elements.

In an advantageous embodiment, at least a part of the mentioned modules comprises a storage element and at least a part of the modules comprises an energy conversion element. Such a system is advantageous, for example, if solar cells are used as the energy conversion elements. Such a system can maintain a constant desired voltage or phase of a desired voltage even under varying incident solar radiation. If the power generated by the solar cells exceeds the power which is tapped off, the excess energy can be used for charging the storage elements. Conversely, during periods of lower incident solar radiation the solar cells can be supported by the storage elements, so that the required power remains available.

The system of the invention allows not only storage elements and energy conversion elements to be combined in the same energy storage direct converter system, however. A particular advantage is the fact that in the system of the invention, storage elements of different types or with different degrees of ageing, or "state of health", can be optimally used and combined in accordance with their performance. In an advantageous embodiment therefore, one part of the modules have storage elements of a first type and another part of the modules has storage elements of a second type, different from the first type, the first type and the second type differing in particular in one or more of the following features: charging time, internal resistance, and capacity.

This is an important advantage compared to conventional battery systems, in which the cells used must almost always be of the same type and any deviations typically act to the detriment of efficiency or capacity. The facility to combine storage elements of different types or with different properties has a variety of practical benefits. For example, storage elements can be provided for different purposes, to satisfy different requirements under different conditions. For example, storage elements which are extremely fast charging can be provided, and cells which have an extremely large capacity but can only be charged more slowly.

It is also advantageous that differences due to ageing processes, which often proceed at different rates on different products of the same type, do not lead to a fundamental impairment of the system, and therefore can be tolerated to a very large extent. In this respect the storage elements can be used for much longer periods than in conventional battery systems.

In fact, even so-called second-use batteries, which for other applications would already have to be eliminated as unsuitable, can be of practical use in the system of the invention. In this respect it can be assembled or supplemented very cost-effectively with used storage elements, for which there would otherwise be little practical use. Because of the modular design, the system is also easily capable of being expanded and supplemented with used storage elements.

Finally, it is also possible that at least part of the modules contain both a storage element as well as an energy conversion element, as has already been mentioned above.

In an advantageous embodiment the control device is suitable for identifying groups of modules, the storage elements of which are to be connected in parallel, wherein the control device is configured to actuate at least a part of the said plurality of switches depending on the current state of charge of the storage elements in such a way that, prior to the parallel connection of the modules of the group, the voltages or charging states of the modules are equalized, by modules or module subgroups that have a lower voltage or a lower charge state being preferentially charged during a charging process, and/or modules or module subgroups that have a high voltage or high charge state being preferentially discharged during an energy supply mode.

In this manner the charging states of the modules can be equalized without charge having to be transferred from one module to another, which would inevitably lead to losses. This enables all storage elements in a system according to the invention to have very similar charging states at all times. This means that the cell with the lowest capacity does not—as is the case in previous battery systems—determine the two overall charge states "full" or "empty"; instead, the total capacity of such a system is used much more effectively.

In a further advantageous embodiment, the control device is configured to identify the capacity of the storage element of a module, by the storage element being fully charged and fully discharged in the continuous operation of the system and the energy flowing into or out of the storage element being detected.

Finally, the control device is preferably suitable for identifying faulty modules by testing, where the testing includes one or more of the following criteria: Is the storage element defective? Is the storage element short-circuited or open? Is a bypass mode possible? Which switching states are also possible?

In an advantageous embodiment the control device is configured to actuate at least some of the switches in such a way that the system outputs a mains voltage, in particular a three-phase mains voltage of 1000 V or less, preferably of approximately 400 V.

A particularly advantageous application for this system is for solar systems in which the solar cells or solar cell modules form the energy conversion elements, and voltages generated by the solar cells can be converted directly into a mains voltage. If the incoming solar energy generated exceeds the current consumption, then the additional energy, as described above, can be stored in storage elements additionally provided, and then at times in which the power demand exceeds the output of the solar cells, can be extracted from the system as supply voltage.

The invention also relates to an electric drive for a vehicle, which comprises a modular energy storage direct converter system according to any of the previously described embodiments. As mentioned above, for this case no additional converter is required for the operation of the engine, nor any charging converter. In addition, in particular in the case of electric vehicle applications, the advantages of the system, namely an increased energy efficiency, conservation of the battery cells and the facility that the deterioration of individual cells has no influence on the performance of the other cells in the assembly, are of particular benefit.

DESCRIPTION OF THE PREFERRED EMBODIMENT

Figure 1:
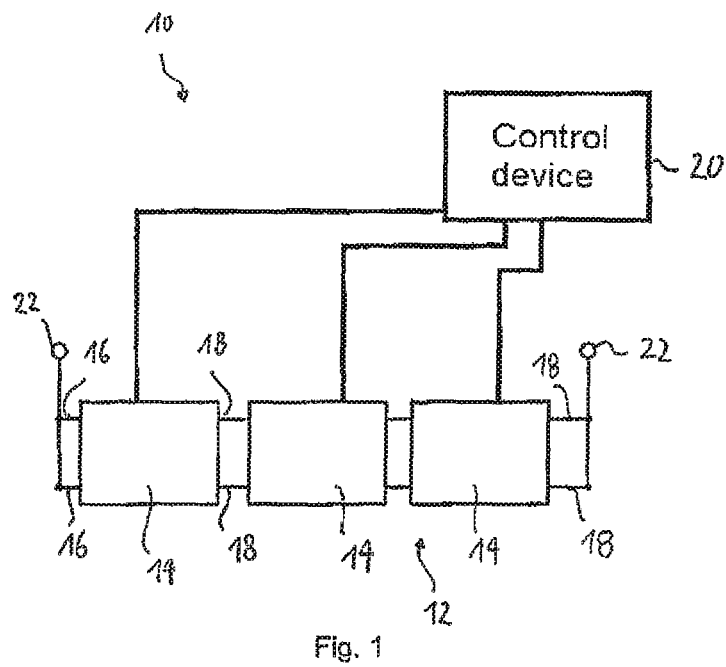
FIG. 1 is a schematic representation of an energy storage direct converter system according to one embodiment of the invention having a single bridge branch.

For a better understanding of the present invention, reference is made hereafter to the preferred exemplary embodiment shown in the drawings, which is described by reference to specific terminology. It should however be noted that this is not intended to limit the scope of protection of the invention, since such changes and further modifications to the device and the method, together with such other applications of the invention as are shown therein, are regarded as present or future knowledge of the person skilled in the art.

FIG. 1 shows an exemplary embodiment of a modular energy storage direct converter system 10 according to one embodiment of the invention. The system 10 comprises a bridge branch 12, which comprises a plurality of modules 14 connected one after the other. For the sake of simplicity, in FIG. 1 only three series-connected modules 14 are shown, it is understood however that the number of modules 14 in a bridge branch 12 in practical applications will be substantially larger, and can number well over 100, in some applications over 1000 and even several 1000. Each of the modules 14 has two first terminals 16 and two second terminals 18, which in the illustration in FIG. 1 are shown only for the module 14 on the far left of the bridge branch. In each of two adjacent modules 14, the first terminals 16 of one module are directly connected to the second terminals 18 of the adjacent module. Instead of a direct connection however, as shown in FIG. 1, terminals of adjacent modules can also be indirectly connected via an intermediate component.

Each of the modules 14 contains a storage element for electrical energy, in particular a battery, or an energy conversion element (not shown in FIG. 1), and a plurality of switches (not shown in FIG. 1). The term battery can again be understood as meaning a single cell or a parallel and/or series connection of cells of an accumulator. A plurality of possible embodiments for the internal structure of the modules 14 are shown in detail below.

Finally, the system 10 of FIG. 1 comprises a controller 20 which is configured to receive information about the current charging state of the storage elements (not shown) or about the voltage or power of the energy conversion elements (not shown). The controller 20 is also suitable for actuating at least a part of the said plurality of switches depending on the current state of charge of the storage elements or the current power or voltage of the energy conversion elements in an energy supply mode, so that the bridge branch 12 as a whole supplies a desired voltage between its terminal connections 22. At the terminal connections 22 in the exemplary embodiment of FIG. 1, the first terminals 16 of the leftmost module 14 and the second terminals 18 of the rightmost module 14 are grouped together, and the applied voltage is tapped off. The connections shown in FIG. 1 from the controller 20 to the individual modules 14 are to be understood as being symbolic. These may involve in each case one or more conductors to the modules 14 or a wireless connection; furthermore, the control device 20 can also be connected over a data bus to one or more of the modules, so that control information can be forwarded to other modules over the data bus. The control device 20 can also actuate the plurality of switches in a charged state in such a way that energy can be absorbed at the terminal connections 22 at a given voltage level.

As shown in detail below on the basis of specific exemplary embodiments, the modules 14 are designed and can be actuated in such a way that the storage element or energy conversion element of a module 14 can be selectively deactivated, and that the storage elements or energy conversion elements of two modules 14, which are separated by at least one intermediate module 14 with a deactivated storage element/energy conversion element, can be selectively connected in parallel and in series.

In this context, the term "deactivation" of a storage element/energy conversion element means that the element concerned is not involved in the energy supply process or a charging process. Due to the facility to "skip over" individual deactivated modules 14 and nevertheless to connect such modules 14, which are separated by deactivated modules, either in parallel or in series, almost any voltage waveforms can be generated as the output at the terminals 22, and the system 10 can be charged by practically any voltages applied to the outermost terminals 22, whether they be DC or AC, and indeed in both cases in such a way as to avoid a lossy charge transfer between the modules 14. It should be noted that in the following description, the terms "parallel connection" or "series connection" of modules are intended to mean that the corresponding storage elements for electrical energy, or energy conversion elements, are connected in parallel or in series.

Figure 2:
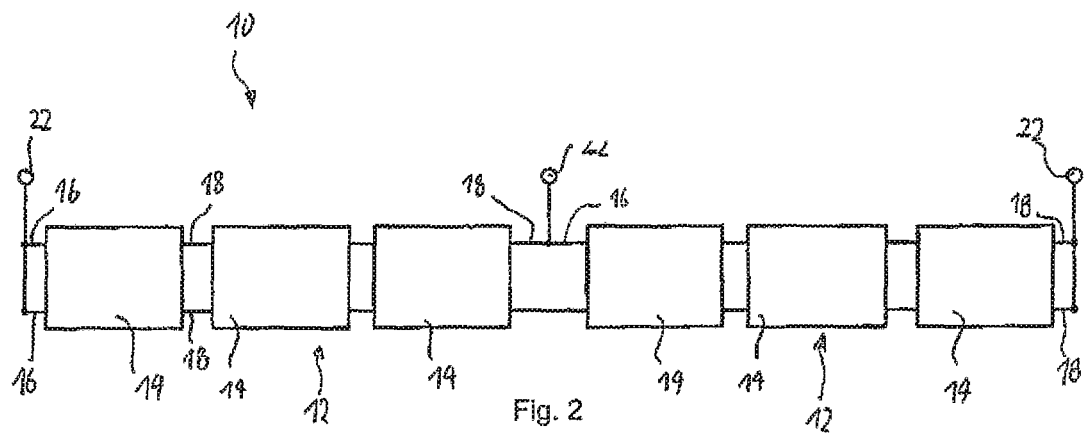
FIG. 2 is a schematic representation of an energy storage direct converter system having two bridge branches and three outermost terminals for generating three voltage phases.

FIG. 2 shows an embodiment of a further system 10, which comprises two bridge branches 12 with a total of three outermost terminals 22. At the outermost terminals 22, for example, three phases of a voltage can be tapped off. It should be noted that, in a similar way to the embodiment of FIG. 1, at the left-hand outermost terminal 22 the first terminals 16 of the adjoining module 14 are grouped together, and that at the right-hand outermost terminal 22 the second two connections 18 of the adjoining module 14 are also grouped together. In the embodiment of FIG. 2 the output 22 between the two bridge branches 12, however, is only connected to one first or second output of the adjacent modules 14 in each case. In this way, an additional current path is formed in the overall system, which increases the number of degrees of freedom and the operational capabilities. But it would also be possible to group together the first and second terminals 16, 18 of the adjacent modules 14 at the central connection 22.

It is important to note that the modular energy storage direct converter system 10 of FIG. 2, as well as the other systems described hereafter, is provided with a control device 20 which receives information about the charging states, voltages or output powers and actuates the switches of the modules 14 accordingly, but which is not shown in the following figures for the sake of simplicity.

Figure 3A:
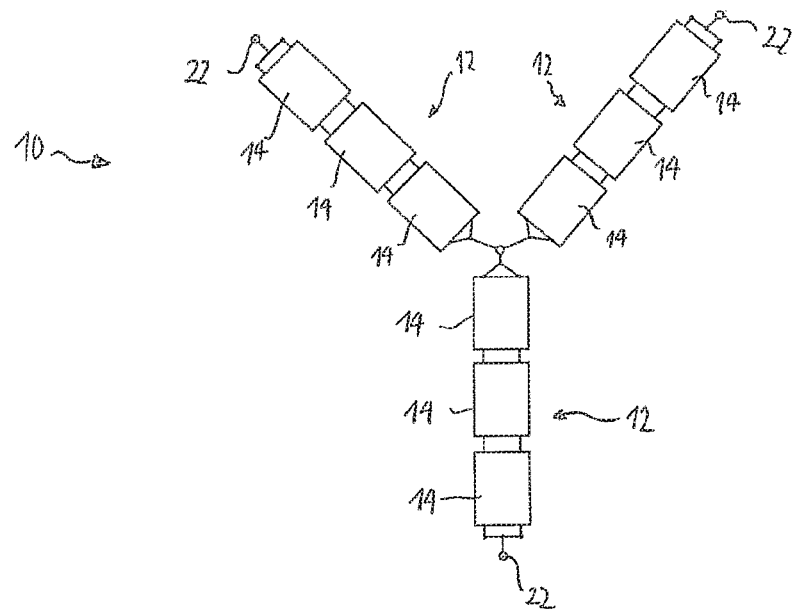
FIGS. 3, A and B show energy storage direct converter systems having three bridge branches arranged in a star topology, each module having two first and two second terminals.
Figure 3B:
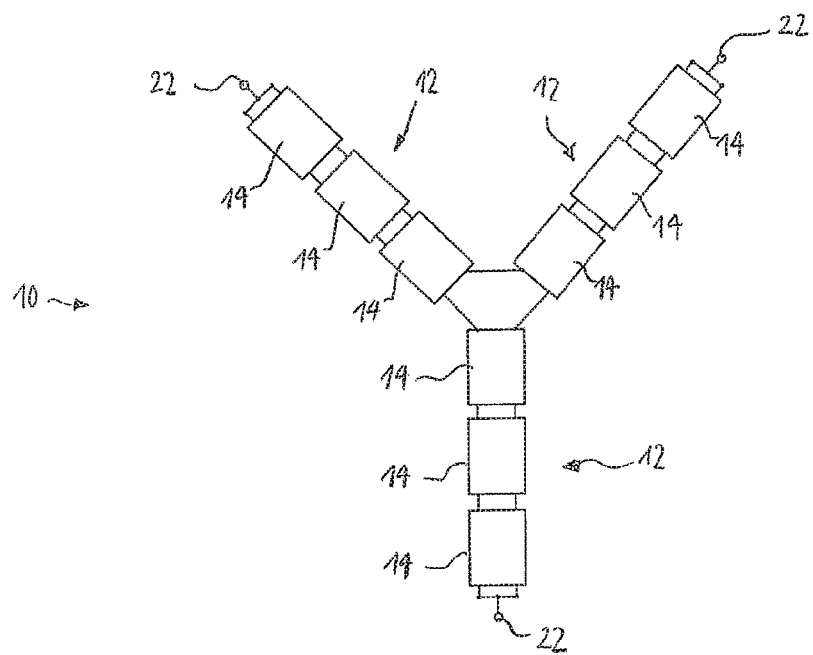
Figure 4:
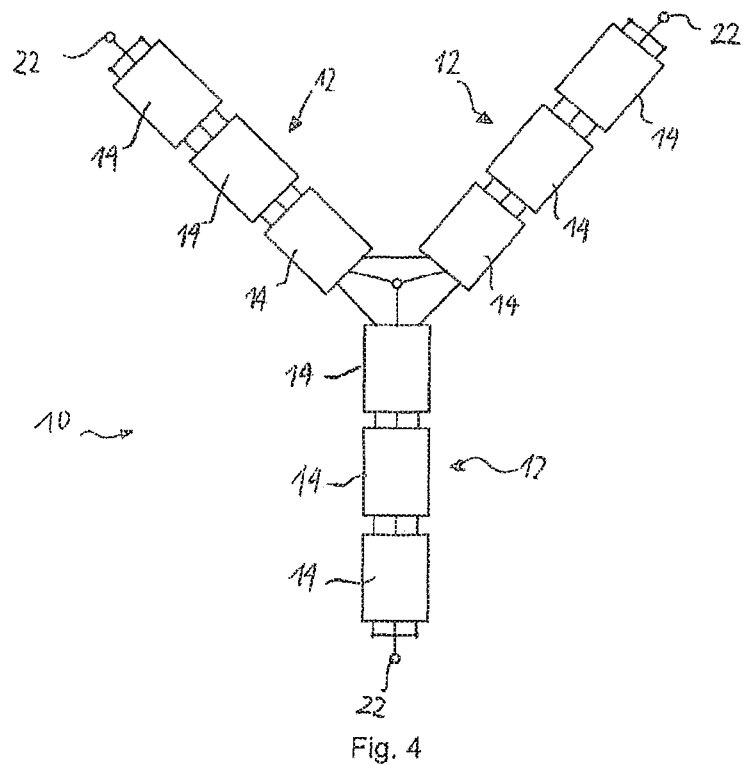
FIG. 4 shows an energy storage direct converter system having three bridge branches arranged in a star topology, each module having three first and three second terminals.

FIG. 3A shows a further exemplary embodiment of a modular energy storage direct converter system 10, which contains three bridge branches 12 that are arranged in a star structure. At the respective outermost external terminals 22 of the bridge branches 12, three phases can be tapped off. The connections of the inner modules 14 are grouped together at the topological centre of the system. They can also, however, as is shown in the variation of FIG. 3B, be separately connected in each case to one associated connection of an inner module 14 of a different bridge branch. Finally, FIG. 4 shows a further variant, in which each module 14 has three first and three second terminals. Of the three inner connections of each of the inner modules 14 in the embodiment of FIG. 4, one is connected, while the other two connections are separately connected to terminals of an inner module 14 of a different bridge branch 12.

It is important to note that during operation, not all phases of the system 10 have to be used. For example, each of the three-phase systems 9 shown in FIG. 2-4 can also be charged and discharged using single-phase alternating current, or even by direct current at only two connections 22. Thus it would be possible, for example, to charge the system 10 with 230 V alternating current, but in operation deliver 400 V three-phase power. In the specific application case of electric vehicles, this would mean, for example, that an electric vehicle could be selectively charged with either 230 V AC or 400 V three-phase, depending on availability.

It is important to note that the star topology shown in FIG. 3a-4 may be varied to an arbitrary number of phases, by further bridge branches 12 being inserted into the star structure.

Figure 5:
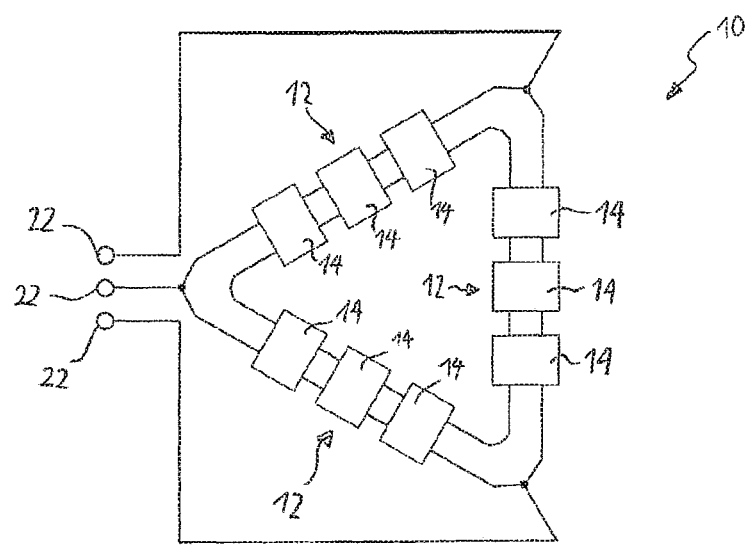
FIG. 5 is a schematic representation of an energy storage direct converter system having a ring topology.

FIG. 5 shows a further energy storage direct converter system 10, in which three bridge branches 12 are arranged in a ring structure. In the example shown, the connectors of the module 14, which are located at the inner ends of the bridge branches 12, are not grouped together, although this would be quite possible in an alternative embodiment. The advantage of the topology chosen in FIG. 5 is that two controlled and mutually independent ring currents can be conducted, wherein the one ring current can be used, for example, for compensating for an asymmetry of the corresponding multi-phase network, while the second ring current can be used for balancing the charge states of individual energy conversion or storage elements—also beyond the phases of the system 10. For the energy storage direct converter system 10 shown in FIG. 5 it is also the case here that charging or discharging with AC or DC power can take place via just two of the three tapping points 22. In addition, here also the topology can be extended to any number of phases. It should also be noted that even in the event of failure of an entire bridge arm 12, the functional capacity to generate a corresponding multi-phase voltage system is maintained. Only the generation of the second ring current for balancing operations is interrupted in such an event.

Figure 6:
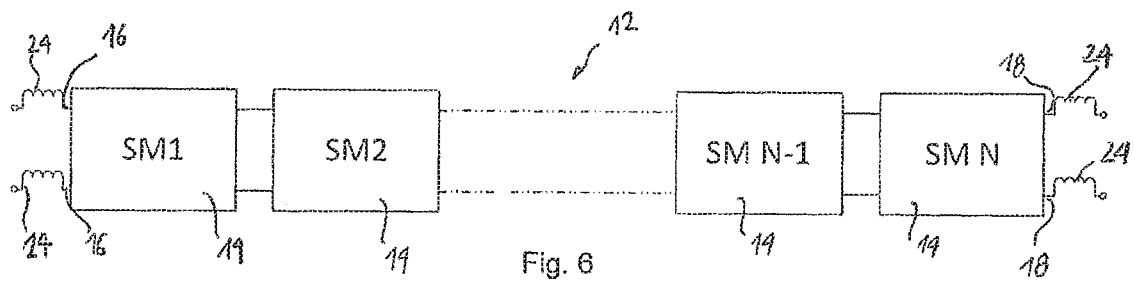
FIG. 6 shows a circuit of modules connected one after the other with additional inductances.

FIG. 6 shows a schematic of a bridge arm 12 having a number N of modules connected one after the other, denoted by "SM" (switching module). At the first terminals 16 of the first module, or at the second terminals 18 of the Nth module, inductors 24 are provided in each case, which are intended to attenuate voltage peaks.

Such inductors 24 could also be provided between the modules 14 or inside the modules 14.

Structure of the Modules

In the following, by reference to FIGS. 7 to 22 a plurality of modules 14 is presented, which can be used in the modular energy storage direct converter system 10 according to one of the embodiments of the invention. These modules 14 summarize some of the currently preferred embodiments, but it goes without saying that other modules 14 can also be used, provided that they satisfy the requirements of the system 10 as defined above.

In the following description, a distinction is made between such modules that have two first and two second terminals 16, 18 and those that each have three first and three second terminals 16, 18. It goes without saying that the invention is not limited to these embodiments, and also in particular that more than three first and three second terminals 16, 18 can be provided.

A distinction is also made in the following presentation between modules that can be operated in all four quadrants of the current-voltage plane (in the following description known as "four-quadrant modules") and those which can be operated in only two quadrants of the current-voltage plane ("two-quadrant modules").

Four-Quadrant Modules Having Two First and Two Second Terminals

Figure 7:
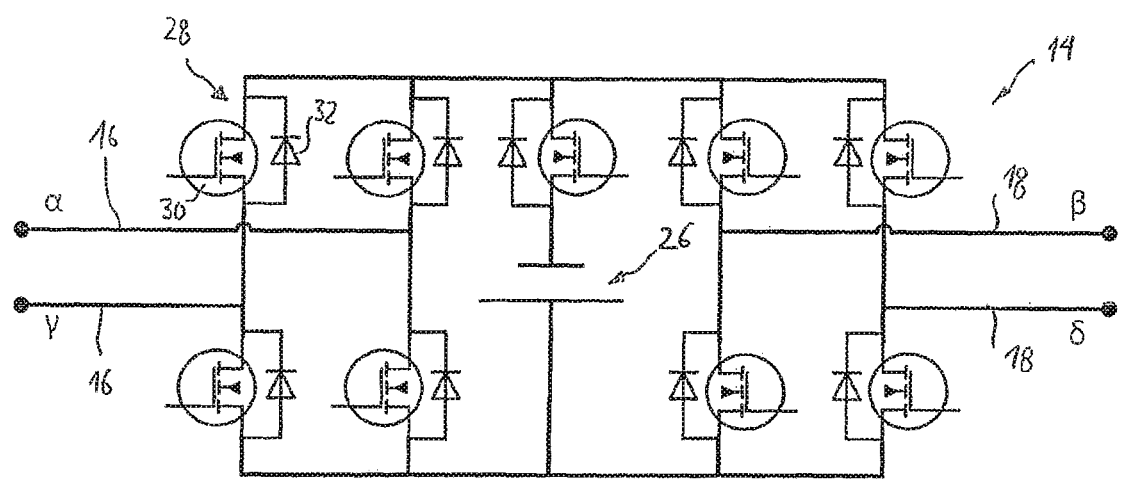
FIG. 7-12 show four-quadrant modules having two first and two second terminals.

FIG. 7-12 show examples of four-quadrant modules each having two first and two second terminals 16, 18. Specifically, FIG. 7 shows a module 14 with a storage element 26 for electrical energy, which can be, for example, a chargeable battery or an accumulator. It goes without saying that other storage elements are possible, for example, a capacitor or a redox flow cell. It also goes without saying that instead of the storage elements 26, energy conversion elements, for example, solar cells, fuel cells or thermocouple elements can also be used, without this being specifically mentioned in the description of the specific embodiments of the modules 14, which are primarily intended to demonstrate the different types of switching topologies.

The module 14 of FIG. 7 comprises nine switches 28, which in the embodiment shown are formed by a MOSFET 30 and a free-wheeling diode 32. It goes without saying, however, that other switches can also be applied, in particular IGBTs, IGCTs, or thyristors. In the following figures therefore, the switches are represented by a generic symbol, wherein it is understood that all of these possibilities may be used.

The module 14 of FIG. 7 is operationally connected to a control device (not shown in FIG. 7), which corresponds to the control device 20 of FIG. 1. This control device receives information regarding the current charging state of the storage element 26, or regarding the current output power or voltage if an energy conversion element is present instead of the storage element 26. This control device is also suitable for actuating the switches 28 of the module 14 and thus for operating them.

The module 14 of FIG. 7 is a four-quadrant module, which can be operated in all four quadrants of the current-voltage plane. If two of the modules 14 shown in FIG. 7 are connected one after the other, then the corresponding storage elements 26 of these adjacent modules can be connected in series with the same polarity, in series with opposite polarity, in parallel with the same polarity, and in parallel with opposite polarity The storage element 26 can also be deactivated by opening the switch 28, which is adjacent to the upper pole, in the drawing of FIG. 7, of the storage element 26.

If a plurality of modules 14 as shown in FIG. 7 is connected one after the other, the storage elements 26 of not only adjacent modules 14, but also of those modules 14 that are separated by one or more deactivated modules 14, can also be selectively connected in series or in parallel.

Figure 8:
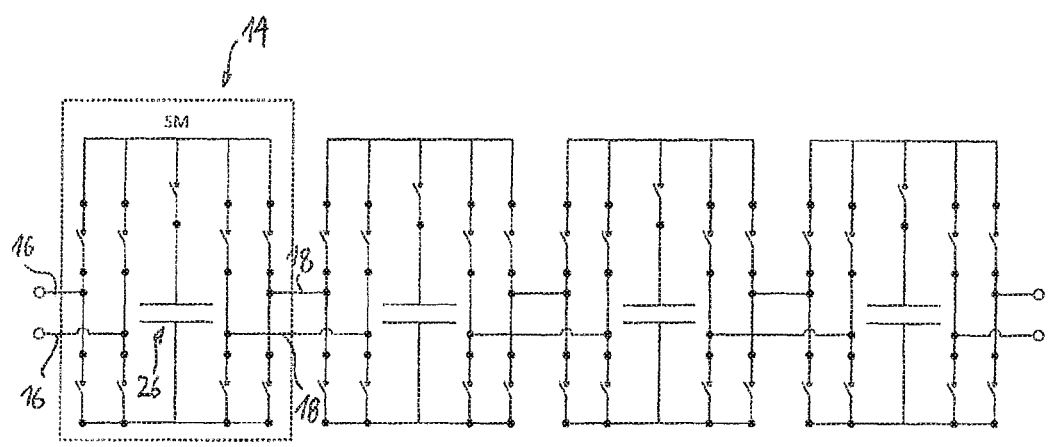

FIG. 8 shows the connection of a plurality of modules 14 according to FIG. 7, in which the combination of MOSFET 30 and free-wheeling diode 32 has been replaced by a simple switch symbol. Also, in the connection of modules one after the other, a single module 14 has been identified by a box drawn with dashed lines.

Figure 9:
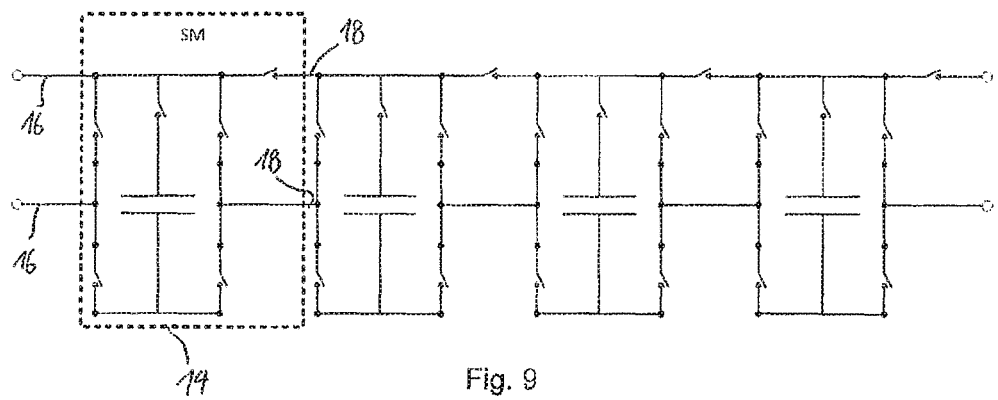

FIG. 9 shows a connection of switching modules 14 of a different type having only six switches 28 per module, wherein a single module is again identified by a box drawn with dashed lines. In this and the following figures, the reference numerals for the switches 28 and the storage elements are omitted, because they are not required for understanding.

It is important to note that in this disclosure, the term "module" 14 is to be interpreted broadly. In some embodiments for practical purpose the modules 14 will be separate assemblies, which can be combined with each other and individually replaced. In other embodiments the modules consist only of functional units within a circuit, without the modules being in any way constructionally separated.

The module 14 of FIG. 9 also contains a switch, via which one pole of the storage element can be disconnected from the rest of the module in order to thereby deactivate the storage element.

Figure 10:
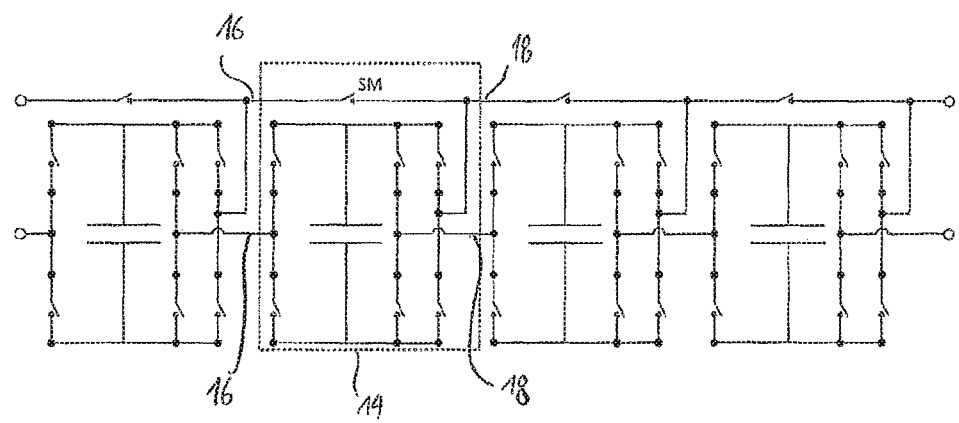
Figure 11:
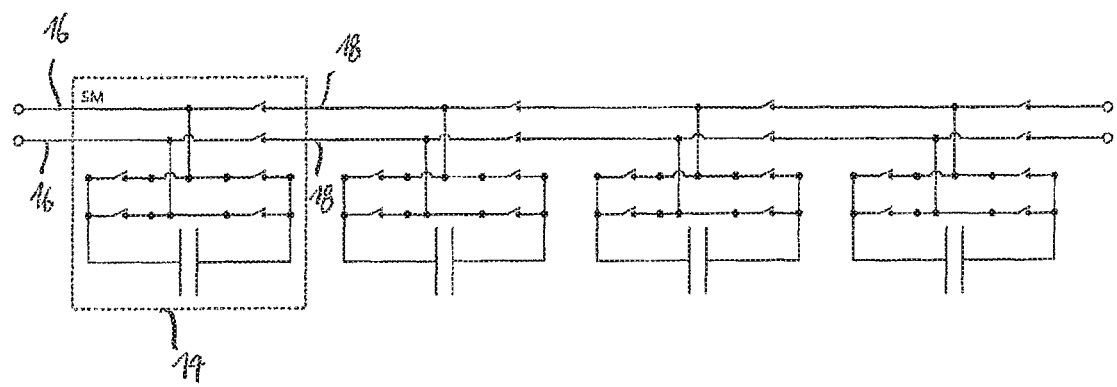

FIGS. 10 and 11 show two other four-quadrant modules 14 having two first and two second terminal terminals 16, 18, having seven and six switches per module 14 respectively. In the modules 14 of FIGS. 10 and 11 the storage element can also be deactivated, however, for this purpose, no switch directly adjoining a pole of the storage element is provided.

Figure 12:
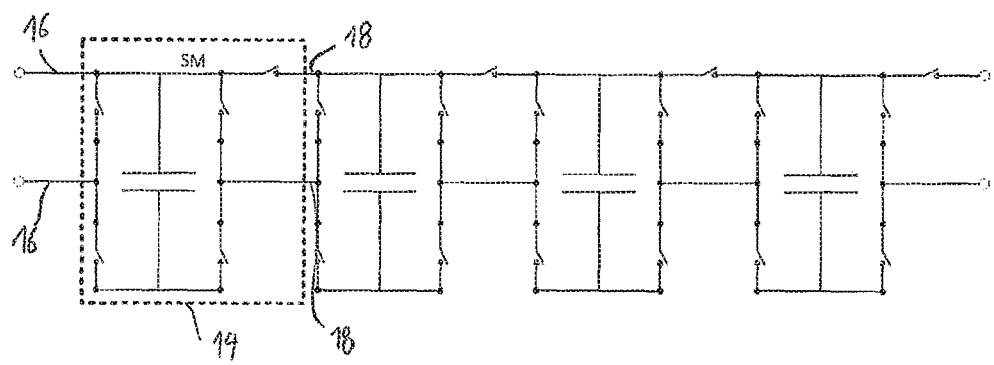
Figure 13:
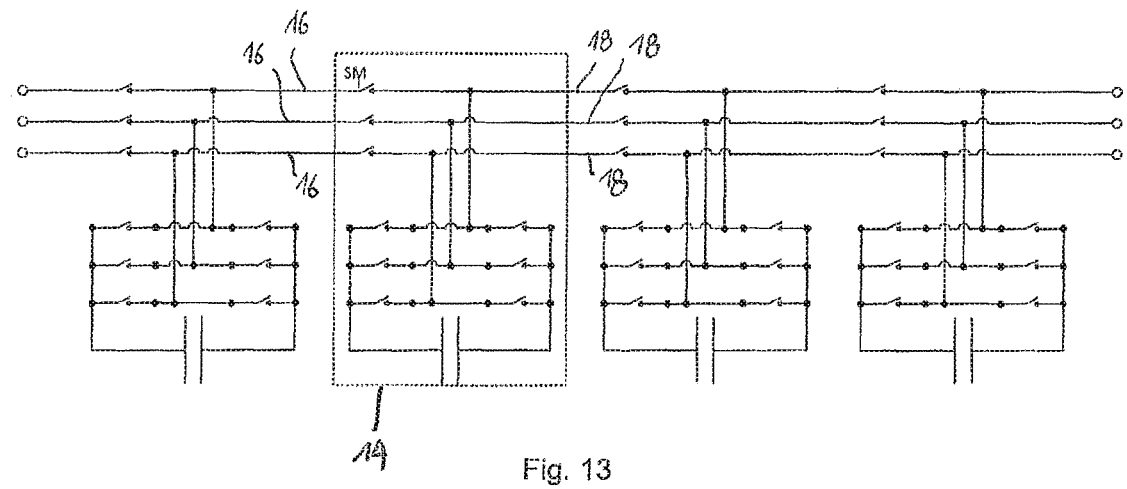
FIG. 13-18 show four-quadrant modules having three first and three second terminals.
Figure 14:
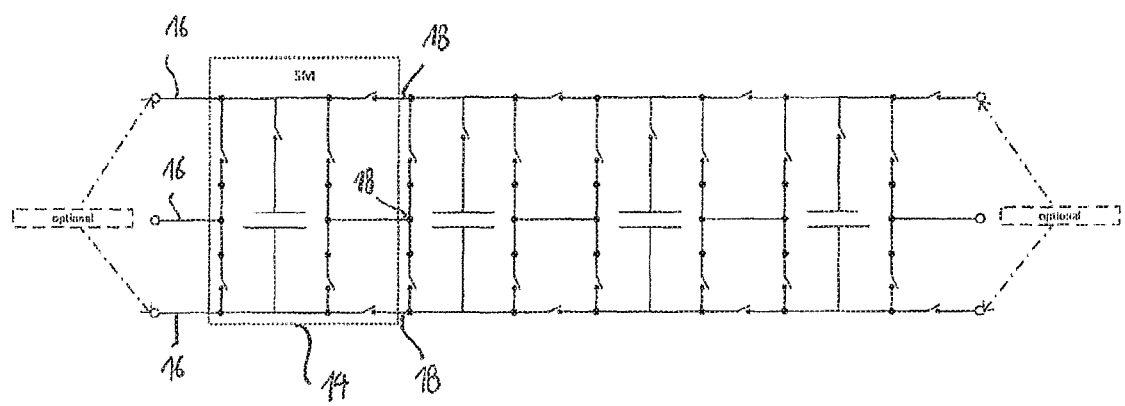
Figure 15:
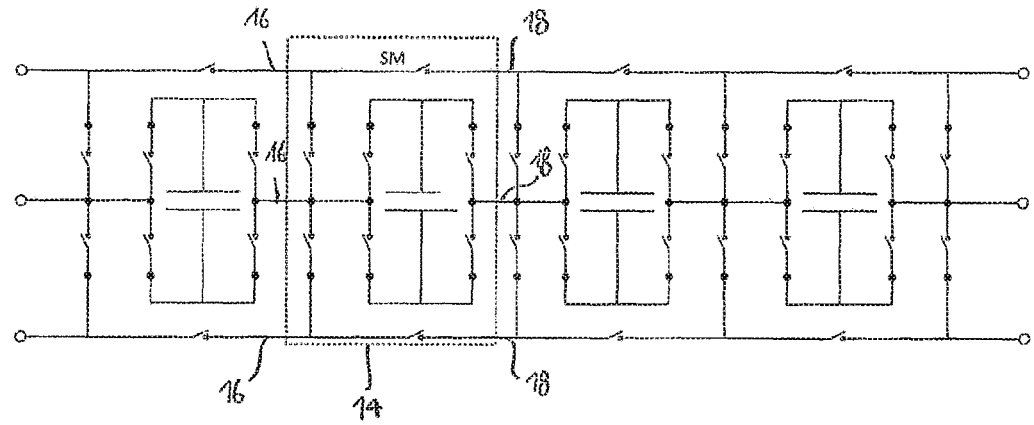

Finally, FIG. 12 shows an embodiment having only five switches per module 14. In the embodiment shown in FIG. 12 however, the modules 14 do not allow the parallel connection of two modules 14 that are separated by one or more deactivated modules 14. FIG. 12 however indicates the option by which the storage elements may be deactivated in a different manner. If, for example, the storage element is a redox flow cell, this can be deactivated by shutting off the pump. In this way the storage element could therefore be deactivated by being actuated by the control unit (not shown), but not by switching one of the explicitly shown switches.

Four-Quadrant Modules Having Three First and Three Second Terminals

Figure 16:
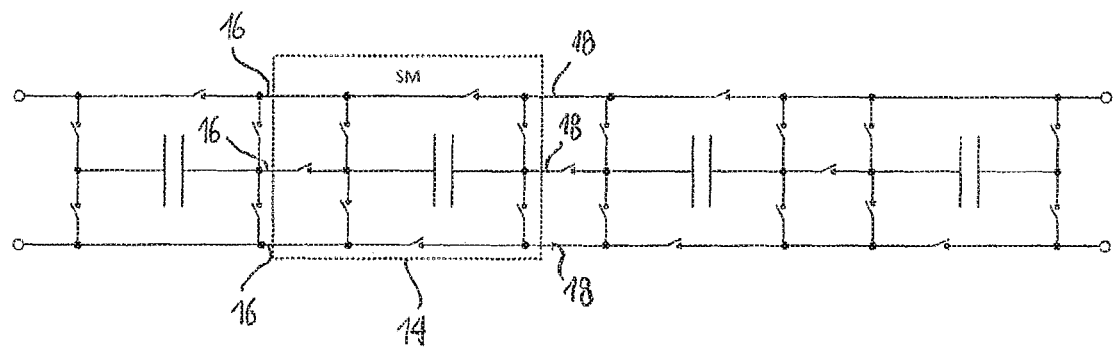
Figure 17:
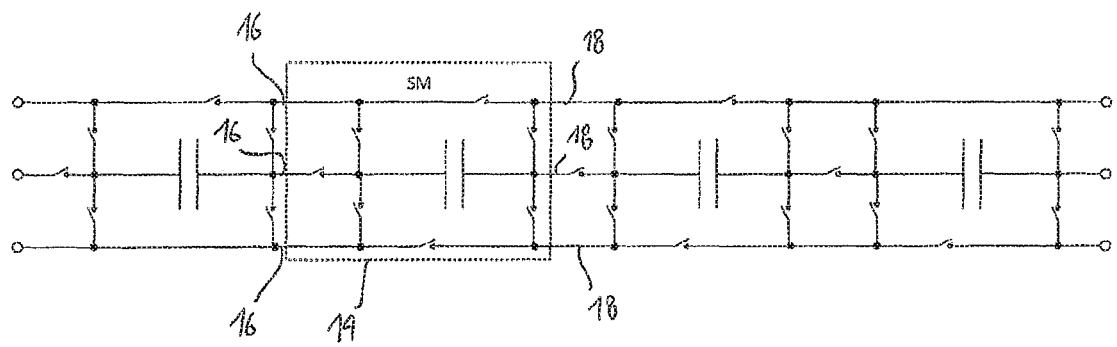
Figure 18:
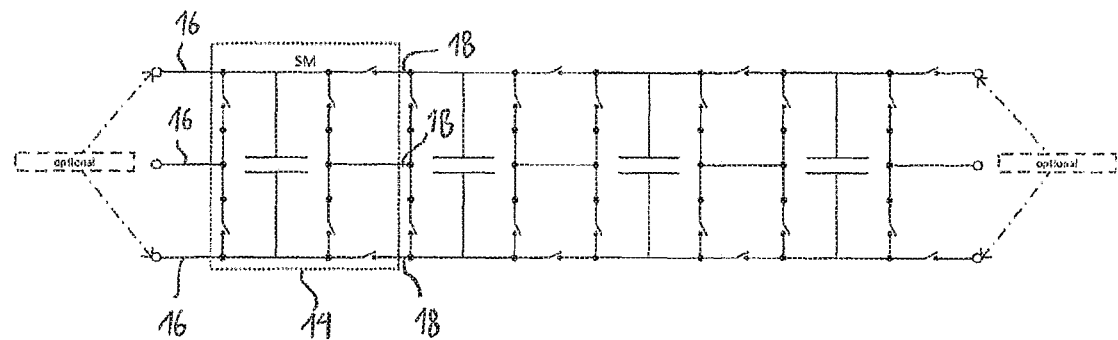

FIG. 13-18 show embodiments of four-quadrant modules, each having three first terminals 16 and three second terminals 18. Generalization to more than three first or second terminals is possible for the person skilled in the art in view of the principles presented here. It is important to note that the module 14 of FIG. 18, similarly to that in FIG. 12, on the basis of the switches 28 alone is not capable of connecting in parallel modules 14 that are separated by one or more deactivated modules 14. The modules 14 from FIGS. 16 and 17 are identical, with the exception of the first or last module in the chain.

Two-Quadrant Modules

Figure 19:
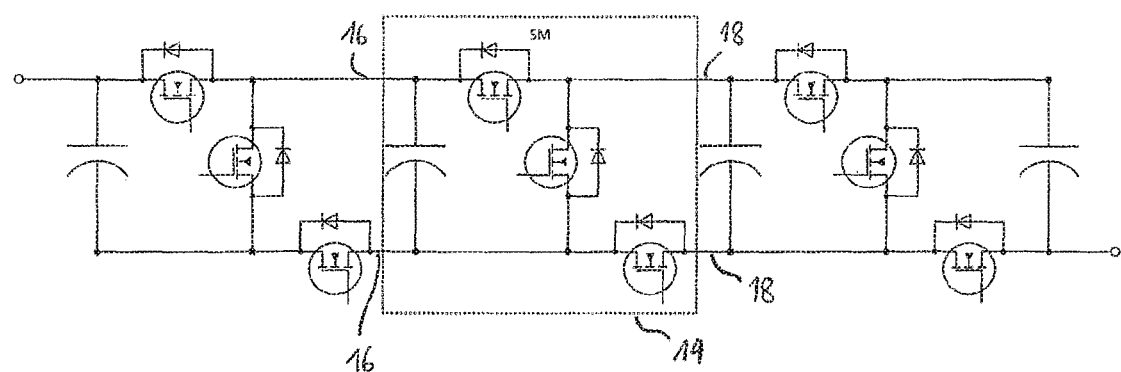
FIG. 19-20 show two-quadrant modules having two first and two second terminals.
Figure 20:
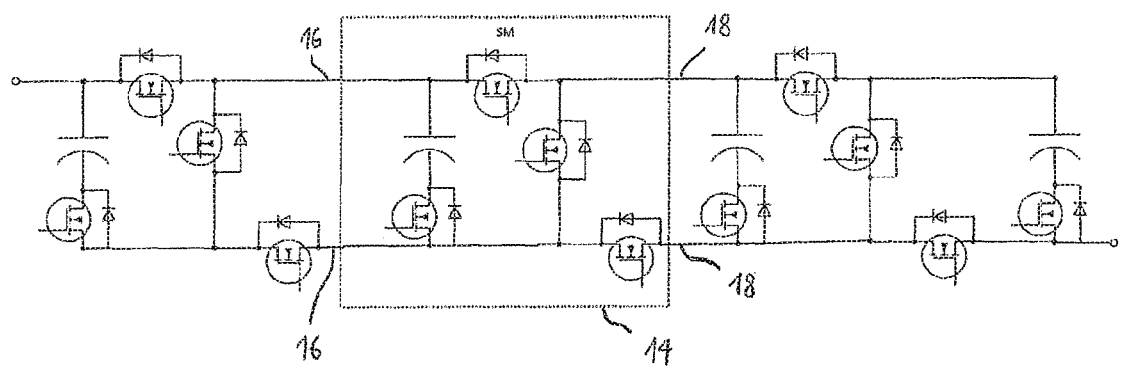

FIGS. 19 and 20 show exemplary embodiments of two-quadrant modules, each having two first and two second terminals 16, 18.

Figure 21:
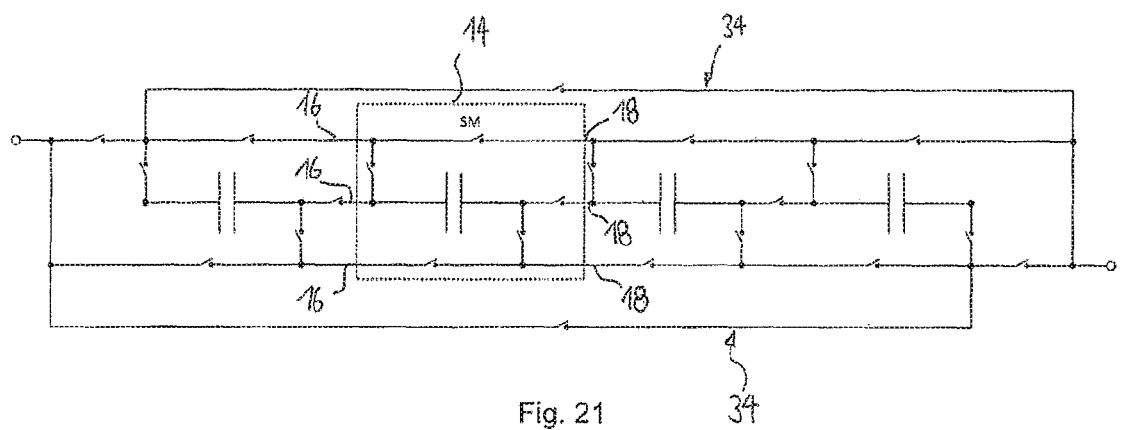
FIG. 21-22 show two-quadrant modules having three first and three second terminals and having an additional circuit for reversing the polarity of a series connection of such modules.
Figure 22:
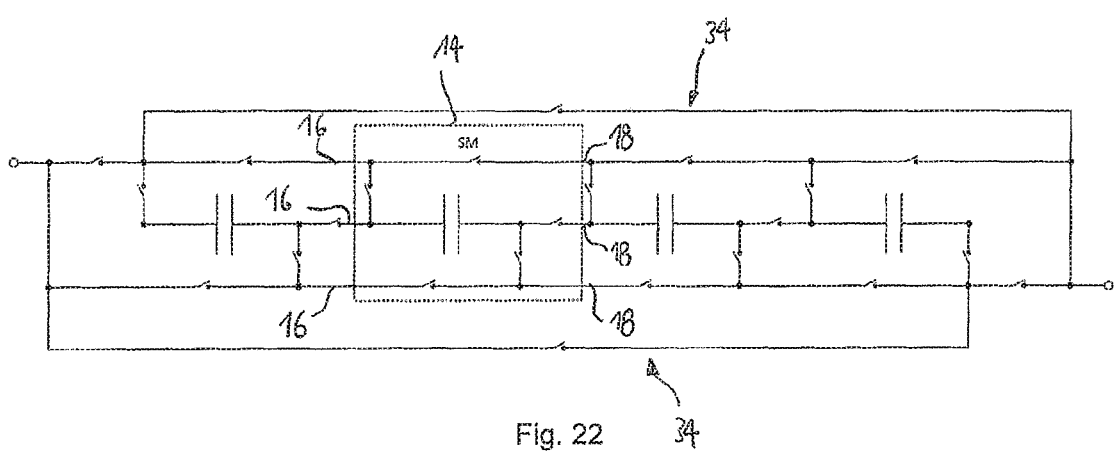

FIGS. 21 and 22 show exemplary embodiments of two-quadrant modules, each having three first and three second terminals 16, 18.

In order to provide the full functionality of the energy storage direct converter system, a chain of two-quadrant-modules can be reversed in polarity as a whole by means of an additional circuit 34, as shown in FIGS. 21 and 22.

Operation of the Energy Accumulator Direct Drive System

Figure 23:
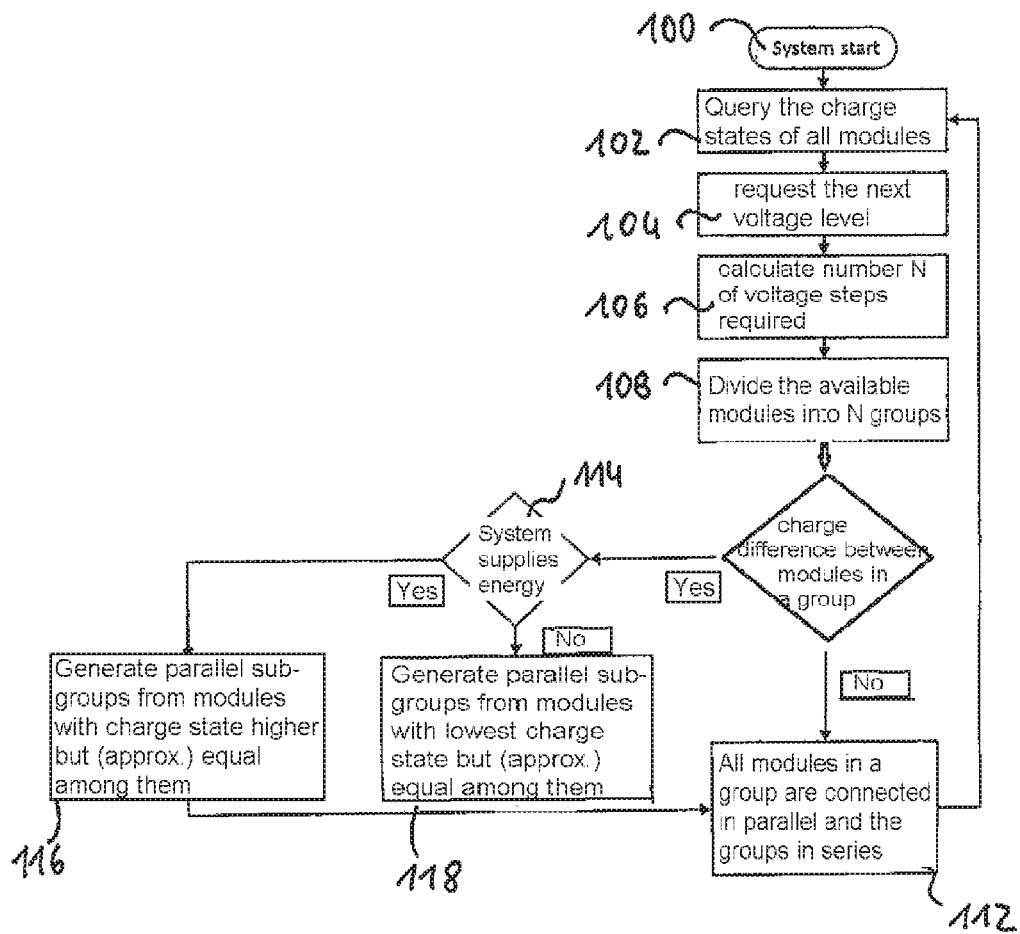
FIG. 23 is a flow chart which illustrates the generation of a desired voltage level.

FIG. 23 shows a flow chart that illustrates the operation of the system according to an embodiment of the invention.

The process begins with the system start at step 100. In the following step 102 the control device enquires the state of charge of all modules 14. In the following step 104 the next required voltage level is enquired. In the following step 106 the control device 20 calculates the number n of voltage steps required to reach the voltage level. If the bridge branch 12, for example, currently has to supply a voltage of 23 V and the storage elements 26, e.g. battery cells, have a voltage of 5 V, then to obtain the voltage, N=6 voltage stages would be required.

In step 108 the available modules 14 are divided into N groups.

In step 110 it is tested whether a difference exists between the storage elements 26 of a group with regard to the charge status. If this is not the case, the process moves forward to step 112, in which all modules 14 in a group are connected to each other in parallel and the groups connected to each other in series. The process then jumps back to step 102 and the process begins again.

If in step 110 it is determined that the storage elements 26 within a group have different charging states, in the following step 114 it is tested whether the system is supplying energy, i.e. if it is in the energy supply mode. If this is the case, in the following step 116 subgroups are formed within the group from modules 14, the storage elements 26 of which have a charge state which is higher but equal, or at least almost equal, among themselves. In the extreme case, this subgroup can even be formed of a single module 14. The process then proceeds to step 112 again, in which the modules 14 are connected in parallel and the groups in series with each other. Since the system here is in the energy supply mode, the storage elements 26 of the parallel connected subgroup are discharged while the storage elements 26 of the other modules 14 of the group are deactivated and are therefore conserved, i.e. an equalization of the charging states takes place. In this way, the process automatically leads to a situation where the modules 14 are approximately equally charged at all times.

If in step 114 it is determined that the system is not supplying energy but is in the charging mode, then in step 118 from such modules 14 subgroups are formed which have a charge state which is lowest, but at least approximately the same among themselves, and in step 112 these are then connected in parallel and in series with the modules 14 of the other groups. In this case therefore, those modules 14 which have the lowest charge state are given preferential consideration during charging, which in turn enables an equalization of the charging state to be obtained.

It can be seen that it is essential for this process that individual modules 14 can be deactivated and that modules 14, which are separated by one or more deactivated modules 14, can be selectively connected either in parallel (within a group) or in series (namely modules from different groups).

Figure 24:
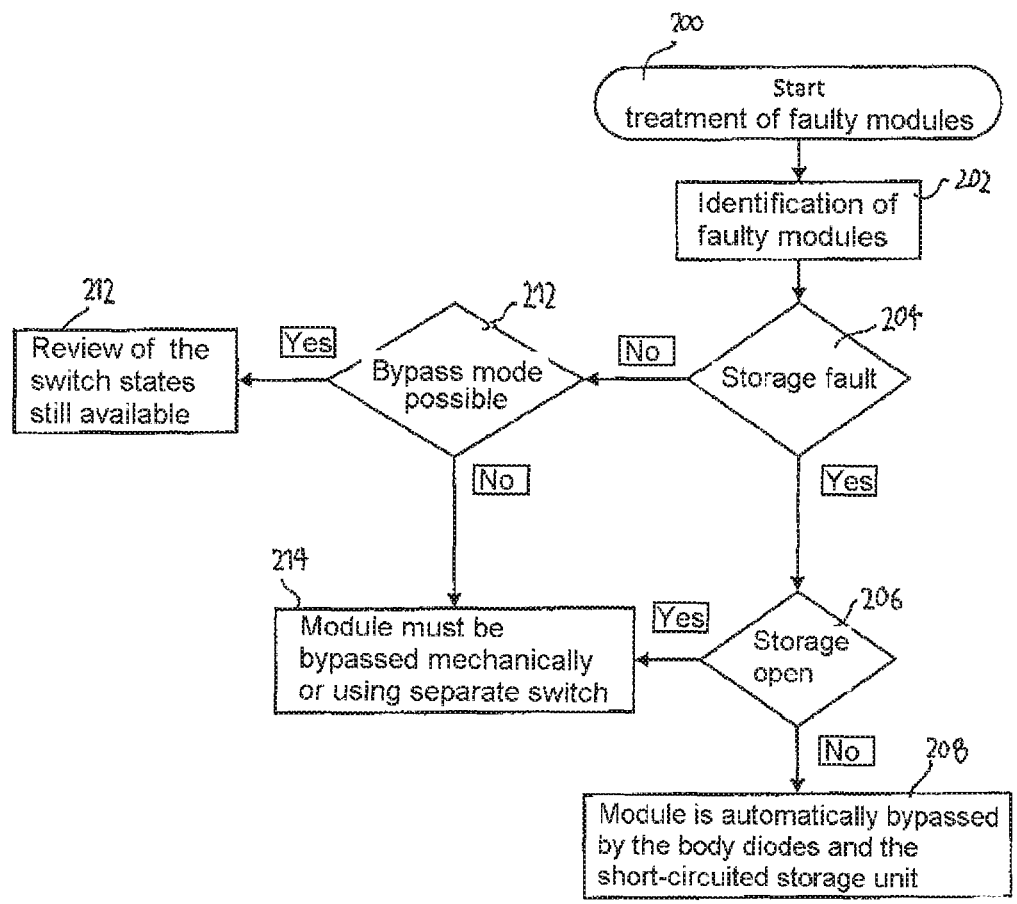
FIG. 24 is a flow chart of a process in which faulty modules are identified.

FIG. 24 shows a flow chart that illustrates the treatment of faulty modules 14. The process starts in step 200. In the following step 202 a faulty module 14 is identified. In step 204 it is tested whether the fault is due to a defective storage element 26. If this is the case, then in step 206 it is tested whether the storage element 26 is "open", i.e. whether current can flow through the storage element 26 or not. If the storage element 26 is not open, this means that the module 14 is being automatically bypassed by the body diodes 32 and the short-circuited storage element 26 (step 208). This means that although the module 14 can no longer be used for energy absorption or energy supply, it does not disrupt the operation of the other modules 14 either.

If in step 204 it is determined that the fault does not lie in a defective storage element 26, in step 210 it is tested whether a bypass mode of the module 14 is possible. If this is the case, it is then only tested in step 212 which switching states are still possible. If a bypass is not possible however, the module 14 must be bypassed either mechanically or by a separate switch (step 214). The same applies if in step 206 it is determined that the fault is in fact due to a defective storage element 26, but that the storage element 26 is "open".

Figure 25:
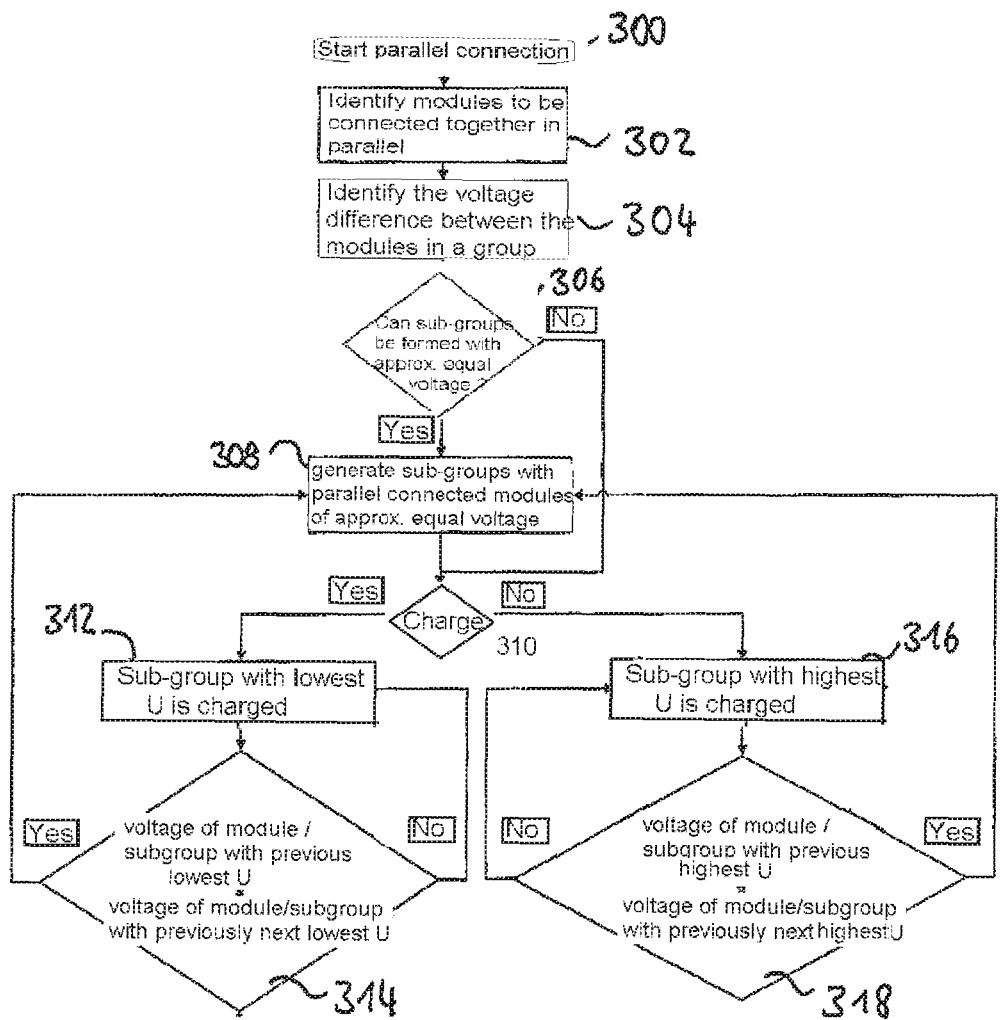
FIG. 25 is a flow chart of a process in accordance with which modules with voltage differences are equalized in voltage and connected in parallel.

In FIG. 25 a flow chart of a process is shown which controls the parallel connection of modules 14. This process is conceptually similar to the process of FIG. 23.

The process starts in step 300. In the following step 302, those modules 14 are identified which are to be connected to each other in parallel. Similarly to the process of FIG. 23, such modules 14 as are to be connected in parallel form a group.

In the following step 304, a voltage difference is determined between the modules 14 within the group and in the following step 306 it is determined whether groups with approximately the same voltage can be formed. If this is the case, then in step 308 subgroups are formed with parallel-connected modules 14 of approximately equal voltage.

Subsequently, the process proceeds to step 310, in which a test is performed to determine whether the system is in a charging mode or not. If in step 306 it was established that no subgroups can be formed with approximately the same voltage, the process also continues with step 310.

If in step 310 it is determined that the system is in a charging state, in step 312 the module 14, or the subgroup with the lowest voltage U or the lowest charge state, is charged. In the following step 314 it is tested whether the voltage of the module/subgroup with the previously lowest U is equal to the voltage of the module or subgroup with the previously second lowest U. If this is not the case, the process returns to step 312 and the module 14 or the subgroup with the lowest voltage U continues to be charged. In this way, the voltages of the module 14/subgroup with the lowest voltage is successively raised to the level of the module 14/subgroup with the second lowest voltage until these match. In this event the process returns to step 308.

If in step 310 it is established that the system is not in a charge state, but in the energy supply mode, the steps 316 and 318 are performed, which are the mirror image of steps 312 and 314 and need no further explanation.

It is evident therefore that the parallel connection is carried out in such a way that in the charging state, modules 14 and groups of lower voltage are successively charged in order to align or equalize the voltages. As soon as the voltages are equalized, modules 14 or subgroups are connected in parallel. In this way, no current flows between the modules 14 in the parallel connection case, which enables losses to be kept low. It is important to note that the process described is an "equalization process", not a "balancing process" between storage elements 26, which would be liable to losses.

Figure 26:
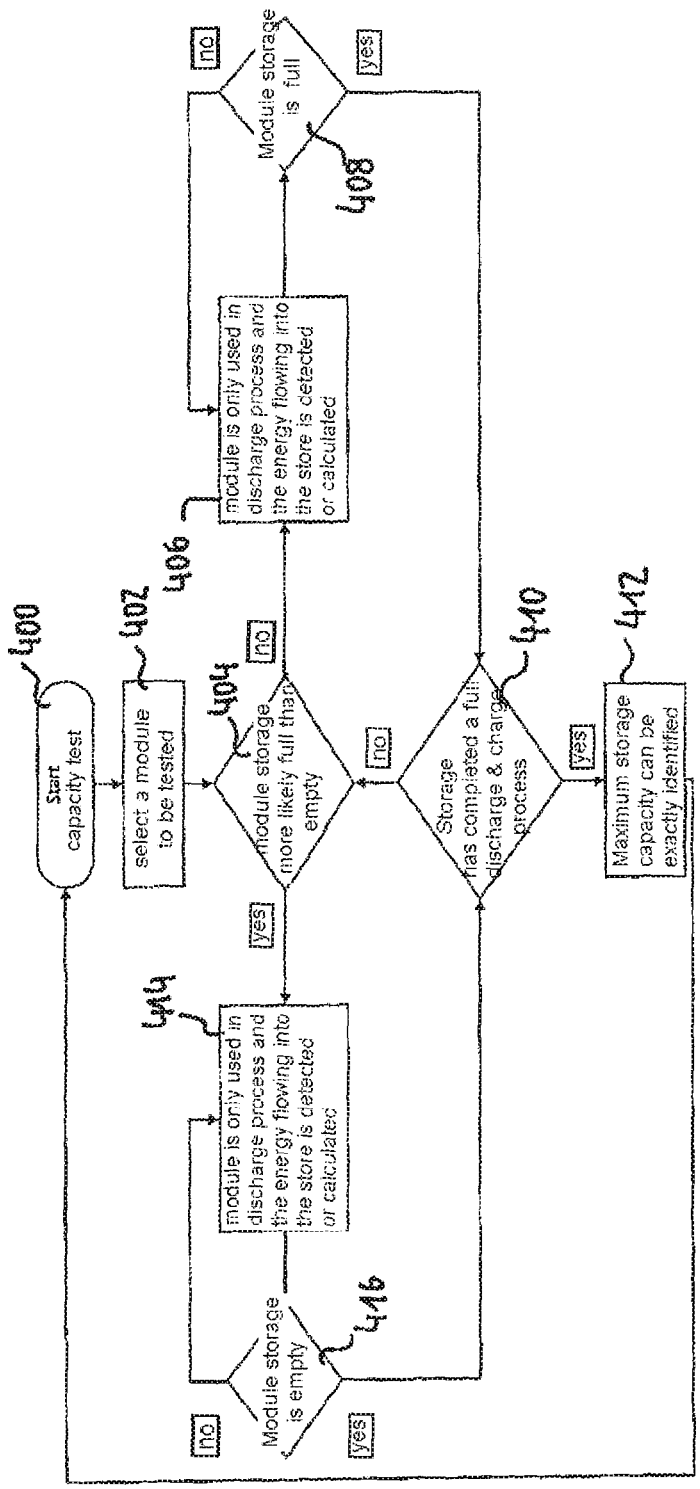
FIG. 26 is a flow chart which illustrates the testing of the capacity of a module in continuous operation.

Finally, FIG. 26 shows a process in which the control device 20 tests the capacity of a storage element 26. The process starts in step 400. In the following step 402 a module 14 to be tested is selected. In step 404 it is tested whether the storage element 26 of the module 14 is closer to a full state than to an empty state. If this is not the case, in the following step 406 it is stipulated that the respective module 14 is only to be used during charging operations but not for discharging operations, and the energy which flows into the storage element 26 is detected or calculated.

After each charging operation it is tested in step 408 to determine whether the storage element 26 is full. If this is not the case, the process returns to step 406 and the storage element 26 of the module 14 will continue to be charged. As soon as it is established in step 408 that the storage element 26 of the corresponding module 14 is full, the process proceeds to step 410, in which it is tested whether the storage element 26 has completed a full discharge and charge cycle. If this is the case the process moves to step 412 and the maximum capacity of the energy storage element can be determined exactly. If this is not the case, the module must first proceed through a complementary discharge process which takes place through steps 414 and 416.

Steps 414 and 416 are the counterpart to steps 406 and 408 and need no further explanation. In this way, with the system 10 according to the invention it is possible, either in accordance with the steps described in FIG. 26 or with slightly different steps, to fully charge or discharge individual energy storage elements 26 in on-going operation, in order to determine their capacity. In particular, even during a charging operation of the energy storage direct converter system 10, a single storage element 26 can be discharged by its charge being transferred to other storage elements. Conversely, a single storage element 26 can also be charged during a discharge process of the energy accumulator direct converter system 10, by charge being transferred to the individual storage element 26 from other storage elements 26.

As can be seen from the above description, the energy storage direct converter system of the invention provides a system which works in a highly efficient manner, renders a separate charge management system superfluous and, in particular when using chemical energy storages, increases their working capacity and service life. In an energy supply mode the system allows any desired voltage waveforms to be generated, whether operated synchronous to the grid or in stand-alone mode. Conversely, electrical energy with any desired voltage waveform can be absorbed by the system and stored in the said storage elements.

The fact that in the system of the invention the functions of a consumer converter, a charging converter and a standard battery management system can be provided integrally by means of the switchable modules and the associated control device, means that the efficiency of the system can be increased compared to conventional systems.

A balancing of the charge state is preferably effected by integrating cells with a higher state of charge, preferably in the energy supply mode, and cells with low charge state preferably in the charging process, without a "charge transfer" between storage elements being necessary.

The system allows the use of different technologies in one system, in particular the combination of different types of storage elements with different types of energy conversion elements.

The system also enables the so-called "second-use" of decommissioned cells of other battery systems, regardless of their physical or electrical properties and without any additional electrical components, such as DC/DC converters and DC/DC intermediate circuits. The system also allows the simple combination of different battery technologies and the related combination of the individual advantages, such as quick charging cells with low capacity combined with high-capacity cells but with longer charging times. Due to the modular design, the energy storage and energy converter elements can be easily replaced, even during operation. It is also possible, without any major restriction on the functionality of the overall system, to take individual storage elements or energy conversion elements out of service using the deactivation method described.

Due to its construction, the system is also extremely redundant and robust against failure, and as a result of its modular structure it can be scaled as required, both in terms of its power and its overall capacity.

A further advantage is the fact that the currents and voltages of the individual modules 14 can be kept low, so that only voltages below the protective extra-low voltage occur, and the conditions of protection class III can therefore be met. This avoids the risk of electric shock, significantly increasing the safety of the user and the service personnel.

In the case of applications in electric vehicles, the system combines the functionality of a conventional battery, a converter for the engine and a charging converter. Due to its ability to be freely configured and the large number of degrees of freedom, the system is compatible with all the charging current sources. Even a DC fast-charging process is not detrimental to the service life of the battery or accumulators—in contrast to current systems—or only minimally so.

Finally, the system can directly absorb or supply AC or three-phase power, and so be directly connected to an electrical machine, or an AC transmission or domestic mains network.

The features of the invention disclosed in the description, the claims and the drawings can be essential to the implementation of the invention both individually and in any desired combination.

LIST OF REFERENCE NUMERALS

10 energy converter direct converter system
12 bridge branch
14 module
16 first input
18 second input
20 control device
22 outermost terminal
24 inductance
26 storage element
28 switch
30 MOSFET
32 free-wheeling diode
34 reverse polarity circuit

What is claimed is:

1. A modular energy storage direct converter system, comprising:
 at least one bridge branch, which comprises a plurality of modules connected one after the other,
 wherein each of these modules comprises:
 at least two first terminals and at least two second terminals,
 a storage element for electrical energy, or an energy conversion element, and a plurality of switches,
 wherein in each case in two adjacent modules among the said modules, the first terminals of the one module are connected either directly or via an intermediate component to the second terminals of the other module,
 a control device, which
 is configured to receive information regarding the current charge state of the storage elements or voltage or output power of the energy conversion elements, and
 which is suitable for actuating at least a part of the said plurality of switches depending on the current charge state of the storage elements or the current output power or voltage of the energy conversion elements in an energy supply mode, so that the bridge branch as a whole supplies a desired voltage or a desired phase of a voltage, and for actuating at least a part of the said plurality of switches in a charging mode depending on the current state of charge of the storage elements, or on the present power output or voltage of the energy conversion elements, in order to charge at least some of the storage elements by means of an AC or DC voltage externally applied to the bridge branch,
 wherein the modules are configured in such a way that the storage element or energy conversion element of a module is configured to be selectively deactivated, and that the storage elements or energy conversion elements of two modules, which are separated by at least one intermediate module with a deactivated storage element /energy conversion element, are configured to be selectively connected in parallel and in series, and wherein the control device is suitable for identifying groups of modules, the storage elements of which are to be connected in parallel, wherein the control device is configured to actuate at least a part of the said plurality of switches depending on the current state of charge of the storage elements, in such a way that before the parallel connection of the modules of the group the voltages or states of charge of the modules are equalized, by modules or module sub-groups that have a lower voltage or a lower state of charge being charged during a charging operation while modules or module sub-groups that have a higher voltage or a higher state of charge are not charged during the charging operation, and/or modules or module sub-groups that have a high voltage or a high state of charge being discharged during an energy supply mode while modules or module sub-groups that have a lower voltage or a low state of charge are not discharged during an energy supply mode, thereby allowing for equalizing the state of charge of the storage elements of the modules without charge having to be transferred from one module to another.

2. The energy storage direct converter system according to claim 1, wherein the storage element/energy conversion element of a module has two poles, and in which the storage element/energy conversion element is configured to be deactivated by a switching state of the switches of the corresponding module, in which at least one of the poles of the storage element /energy conversion element is not connected to either of the first and second terminals.

3. The energy storage direct converter system according to claim 2, in which one of the poles of the storage element/energy conversion element is configured to be decoupled from the rest of the module by a corresponding switch.

4. The energy storage direct converter system according to claim 1, in which the modules are configured to be operated in all four quadrants of the current-voltage plane.

5. The energy storage direct converter system according to claim 4, in which the modules are configured in such a way that the storage elements /energy conversion elements of two adjacent modules are connected
in series with the same polarity,
in series with opposite polarity,
in parallel with the same polarity, and
in parallel with opposite polarity.

6. The energy storage direct converter system according to claim 1, in which the modules are configured to be operated in only two quadrants of the current-voltage plane, and in which an additional circuit is provided, by means of which the polarity of a chain of two-quadrant modules connected in series is configured to be inverted as a whole.

7. The energy storage direct converter system according to claim 4, in which the said four-quadrant modules are formed at least partially by a reversible-polarity chain of at least two two-quadrant modules.

8. The energy storage direct converter system according to claim 1, in which the at least two outermost terminals in one or both of the first and last module of the bridge branch are connected to each other.

9. The energy storage direct converter system according to claim 1, which contains two, three, four, five or more bridge branches.

10. The energy storage direct converter system according to claim 1, in which the at least two outermost terminals in one or both of the first and last module of a bridge branch are separately connected to at least two outermost terminals of a module of an adjoining bridge branch.

11. The energy storage direct converter system according to claim 9 in which the said two, three, four, five or more bridge branches are interconnected in one of a star topology and a ring topology.

12. The energy storage direct converter system according to claim 10, in which two, three, four, five or more bridge branches are interconnected in a ring topology in such a way that the at least two outermost terminals of each bridge arm are separately connected to the at least two outermost terminals of the adjoining bridge arm, and in which the control device is configured to actuate at least a part of the said plurality of switches in such a way that at least two mutually independent ring currents can flow through the ring formed by bridge branches.

13. The energy storage direct converter system according to claim 1, in which the storage elements are formed by one or more of the following elements:
a capacitor,
a battery cell,
a second-use battery cell,
a redox flow cell.

14. The energy storage direct converter system according to claim 1, in which the energy conversion elements are formed by solar cells, fuel cells or thermocouple elements.

15. The energy storage direct converter system according to claim 1, in which at least a part of the said modules comprises a storage element and at least a part of the modules comprises an energy conversion element.

16. The energy storage direct converter system according to claim 1, in which one part of the modules have storage elements of a first type and another part of the modules has storage elements of a second type, different from the first type, wherein the first type and the second type differ in particular in one or more of the following features:
charging time,
internal resistance,
capacity.

17. The energy storage direct converter system according to claim 16, in which at least a part of the modules contains both a storage element and an energy conversion element.

18. The energy storage direct converter system according to claim 1, in which the control device is configured to determine the capacity of the storage element of a module, by the storage element being fully charged and fully discharged during the operation of the system, and the energy which flows into or out of the storage element being detected.

19. The energy storage direct converter system according to claim 1, in which the control device is suitable for identifying faulty modules by monitoring, wherein said monitoring includes one or more of determining whether the storage element is defective, determining whether the storage element is short-circuited or open, determining whether a bypass mode is possible, and determining which other switching states are possible.

20. The energy storage direct converter system according to claim 19, in which the control device is configured to actuate at least some of the switches in such a way that the system outputs a mains voltage.

21. An electric drive for a vehicle, comprising a modular energy storage direct converter system according to claim 1.

* * * * *